United States Patent
Taketsuna et al.

(10) Patent No.: US 7,166,055 B2
(45) Date of Patent: Jan. 23, 2007

(54) TOROIDAL TYPE CONTINUOUSLY VARIABLE TRANSMISSION

(75) Inventors: Yasuji Taketsuna, Okazaki (JP); Shigenori Tamaki, Toyota (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 19 days.

(21) Appl. No.: 10/451,430

(22) PCT Filed: Dec. 21, 2001

(86) PCT No.: PCT/JP01/11261

§ 371 (c)(1),
(2), (4) Date: Jun. 23, 2003

(87) PCT Pub. No.: WO02/053953

PCT Pub. Date: Jul. 11, 2002

(65) Prior Publication Data

US 2004/0116240 A1 Jun. 17, 2004

(30) Foreign Application Priority Data

Dec. 28, 2000 (JP) .................... 2000-402405

(51) Int. Cl.
*F16H 15/38* (2006.01)

(52) U.S. Cl. .................... 476/10; 476/40; 476/42

(58) Field of Classification Search .................... 476/9, 476/10, 40, 42, 46
See application file for complete search history.

(56) References Cited

U.S. PATENT DOCUMENTS 6,146,307 A    11/2000   Takizawa et al.

FOREIGN PATENT DOCUMENTS

| DE | 199 28 603 A1 | 12/1999 |
|---|---|---|
| FR | 1184747 A | 7/1959 |
| JP | A 6/174030 | 6/1994 |
| JP | A 9-229152 | 9/1997 |
| JP | A 10-132066 | 5/1998 |
| JP | A 10-281269 | 10/1998 |
| JP | A-11-51141 | 2/1999 |
| JP | A 2000-507667 | 6/2000 |

*Primary Examiner*—William C. Joyce
(74) *Attorney, Agent, or Firm*—Oliff & Berridge, PLC (57) ABSTRACT

A toroidal type continuously variable transmission, in which an input disc and an output disc are arranged on the common axis with being opposed to each other in the rotatable condition, and in which the rolling member is arranged between the input disc and the output disc, so as to transmit a torque between said input disc and said output disc through said rolling member, by applying the clamping force to said input disc and said output disc in said axial direction, characterized by comprising a clamping force controller for controlling the clamping force to be applied to said input disc and said output disc based on a physical quantity relevant to heat stress of said rolling member.

5 Claims, 4 Drawing Sheets

TOROIDAL TYPE CONTINUOUSLY VARIABLE TRANSMISSION

TECHNICAL FIELD

This invention relates to a toroidal type (or traction type) continuously variable transmission which is constructed with clamping rolling members in order to transmit a torque between the individual discs through the rolling member.

BACKGROUND ART

A continuously variable transmission of this kind is constructed with clamping a disc-shaped roller between a pair of discs arranged opposed to each other. On the outer portion of the opposed face of the pair of discs from the predetermined radius, there is formed a rolling face which has an arcuate shape centered on the point set in between the opposed faces of the pair of discs. This rolling face is leading to circumferential direction of each disc. Thus, the rolling face formed on each disc and incurved in three-dimensional direction is a toroidal plane. In between those rolling faces, a rolling member is clamped in a rotatable condition.

This rolling member is a disc-shaped member and its sectional figure along the in-depth direction of the outer circumferential portion in a plane including the axis of rotation is congruent with the arcuate figure of the rolling face of the disc. Accordingly, the rolling member is rotated by means of rotating one of the discs, and the other disc rotates subsequently. And, a speed change ratio in accordance with the proportion of the contacting radii is set by means of adjusting contacting radius between the rolling member and one of the disc, and contacting radius between the rolling member and the other disc, with inclining the rolling member.

One example of such toroidal type continuously variable transmission is disclosed in Japanese Patent Laid-Open No. 2000-507667. The toroidal type continuously variable transmission disclosed in this Japanese Patent Laid-Open comprises an input shaft and an output shaft arranged in parallel each other. There are arranged two each of input discs and output discs on the input shaft side. Two of input discs are arranged in an axial direction at predetermined interval, and two of output discs are arranged in between those input discs. Two of output discs are constructed integrally with having its rolling face positioned in both sides of the axial direction. And there is provided the rolling face on the opposed face of the input discs and output discs respectively.

Also, one of the input disc and input shaft are constructed with being allowed to move relatively in the axial direction and to rotate integrally. On the other hand, another input disc and input shaft are constructed impossible to move relatively in the axial direction, but possible to rotate integrally. One of the input shafts is arranged inside of a cylinder, and a hydraulic chamber is formed in the cylinder. On the other hand, two of output discs and the input shafts are constructed with being allowed to rotate relatively, and there is provided a chain driveline for transmitting torques of two output shafts to the output shafts. The rolling member is arranged between the input disc and the output disc, and the rolling member is clamped by the rolling faces of each disc.

The torque of the input shaft is transmitted to the output disc via the input disc and the rolling member, then, the torque transmitted to the output disc is transmitted to the output shaft via the chain driveline. The principle of transmission of the torque will be described specifically hereafter. The facial pressure of the contact points between the roller and each disc become high pressure, and the torque is transmitted by shearing resistance of lubricating oil being interposed between the rolling member and each rotary member. It is so-called traction transmission. In short, torque capacity between the input disc and the output disc is changed according to thrust force of each disc against the rolling member. And according to the continuously variable transmission disclosed in the above-mentioned Laid-Open, the clamping force of each disc is controlled by controlling an oil pressure of a hydraulic chamber which is formed inside of the cylinder.

As mentioned above, transmission of the torque in the continuously variable transmission is executed according to the load (pressure) to thrust each disc and the rolling member. Therefore, the bigger torque to be transmitted becomes, the more clamping force for clamping the rolling member increases. In consequence, the amount of heat generated between each disc and the rolling member becomes bigger, thereby the rolling member intends to expand. However, since the clamping force is applied to each disc in the axial direction and expansion of the rolling member is thereby prevented, a heat stress is increased inside of the rolling member. As a result, the facial pressure between each disc and the rolling member becomes higher needlessly, i.e., higher than the facial pressure according to the torque to be transmitted. Accordingly, there is a possibility to deteriorate duration of the life of the rolling member. According to the invention disclosed in the above-mentioned Laid-Open, however, there is no recognition of the relation between clamping force in the axial direction to be provided for each disc and the temperature. Accordingly, there is room for improvement with respect to this point.

This invention has been conceived noting the aforementioned technical problem and has an object to provide a toroidal type continuously variable transmission which can improve the endurance of the rolling member to be clamped between the input disc and the output disc.

DISCLOSURE OF THE INVENTION

In order to achieve the aforementioned object, there is provided a toroidal type continuously variable transmission, in which an input disc and an output disc are arranged on the common axis in the rotatable condition with being opposed to each other, and in which the rolling member is arranged between the input disc and the output disc, so as to transmit a torque between the input disc and the output disc through the rolling member, by applying a clamping force to the input disc and the output disc in the axial direction, characterized by comprising: a clamping force controller for controlling the clamping force to be applied to said input disc and said output disc based on a physical quantity relevant to heat stress of said rolling member.

More specifically, the clamping force may be controlled to suppress the heat stress in case of that the rolling member is expanded.

According to the present invention, therefore, the clamping force to be applied to the input disc and the output disc in the axial direction is controlled based on the physical quantity relevant to heat stress of the rolling member. Accordingly, increase of the heat stress generated on the rolling member is suppressed even in case of the rolling member intends to expand.

The clamping force controller may be constructed to have a function to control the clamping force to be applied to the input disc and the output disc in accordance with the temperature of the rolling member.

The temperature of the rolling member may be detected from the rolling member both directly and indirectly.

With this construction, the clamping force to be applied to the input disc and the output disc in the axial direction is controlled based on the temperature of the rolling member, therefore, increase of the heat stress generated on the rolling member is suppressed even in case of the rolling member intends to expand.

On the other hand, the clamping force controlling device according to the present invention may also be constructed to have a function to control the clamping force to be applied to the input disc and the output disc based on the temperature of lubricating oil to be interposed between the input disc and the output disc.

With this construction, the clamping force to be applied to the input disc and the output disc in the axial direction is controlled based on the temperature of the lubricating oil, therefore, increase of the heat stress generated on the rolling member is suppressed even in case of the rolling member intends to expand.

Moreover, the clamping force controller according to the present invention may also be constructed to have a function to reduce the clamping force to be applied to the input disc and said output disc, in case that the temperature of the rolling member or the lubricating oil excess the predetermined increasing amount of the temperature.

With this construction, therefore, the clamping force to be applied to the input disc and the output disc is reduced in case that the temperature of the rolling member or the lubricating oil excess the predetermined increasing amount of the temperature.

BEST MODE FOR CARRYING OUT THE INVENTION

Figure 2:
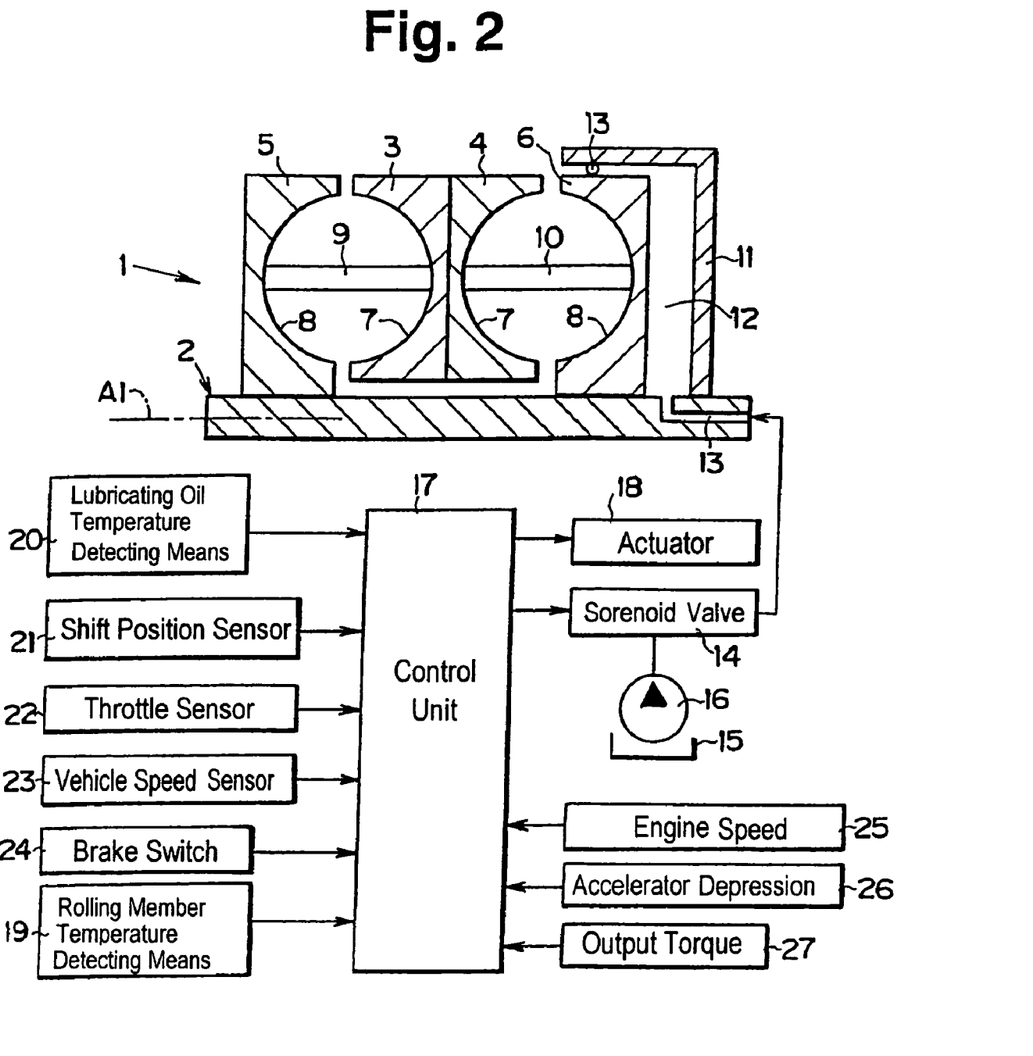
FIG. 2 is a conceptual diagram showing an example of construction of the toroidal type continuously variable transmission according to this invention and its control system.

Next, this invention will be described in connection with a specific embodiment with reference to the drawings. FIG. 2 is a diagram showing one example of the continuously variable transmission in which the present invention is applied. More specifically, it is a conceptual diagram showing the construction of the double cavity type toroidal type continuously variable transmission 1 and the control system of continuously variable transmission 1. The continuously variable transmission 1 comprises an input shaft (not shown) and an output shaft 2, and a motive energy (i.e., a torque) outputted from a power source such as an engine (not shown) is transmitted to the input shaft.

Round shaped input discs 3 and 4 are installed on the output shaft 2. Those pair of input discs 3, 4 and the output shaft 2 are connected with being allowed to rotate relatively, and input discs 3, 4 and the output shaft 2 are connected with being allowed to move relatively in the axial direction. Besides, the pair of input discs 3 and 4 are connected with being allowed to rotate integrally, and the input shaft and the pair of input discs 3, 4 are connected through a motive energy transmission equipment (not shown) such as a chain or a gear.

Moreover, round shaped output discs 5 and 6 are provided in the position opposed to the pair of input discs 3 and 4 in the axial direction of the output shaft 2. Namely, the pair of input discs 3 and 4 are arranged between a pair of the output discs 5 and 6. In other words, the pair of input discs 3, 4 and the pair of output discs 5, 6 are arranged serially in the axial direction of the output shaft 2.

Aforementioned input discs 3, 4 and output discs 5, 6 are formed to have its rolling faces 7, 8 being opposed each other as a full-toroidal face, likewise the toroidal type continuously variable transmission according to prior art. Those rolling faces 7, 8 are formed into round shape with centered on an axis A1 of the output shaft 2. Also, each rolling face 7, 8 has a shape as specifically described hereafter.

That is, the sectional shape of the rolling faces 7, 8 in the plane including the axis A1 of the output shaft 2 is constructed into arcuate shape which has a constant radius with being incurved and centered on the point (not shown) set individually in between the input disc 3 and the output disc 5, and in between the input disc 4 and the output disc 6 as its center of curvature. Namely, each rolling face 7, 8 has a shape such that the intermediate portion between its inner circumferential end and its outer circumferential end is the most sunken (recessed) portion, in the radial direction of each discs 3, 4, 5 and 6.

Also, a plurality of power rollers 9 is arranged at a regular interval between the input disc 3 and the output disc 5, i.e., between the rolling faces 7 and 8 (a cavity, in other words) in the circumferential direction centered on the axis A1 of the output shaft 2. Moreover, a plurality of power rollers 10 is arranged at a regular interval between the input disc 4 and the output disc 6, i.e., between the rolling faces 7 and 8 in the circumferential direction centered on the input shaft.

Those power rollers 9 and 10 are disc shaped members and each power rollers 9 and 10 are held in rotatable condition with centered on the axial line (not shown). Also, power rollers 9 and 10 are held allowable to change the angle between the axis A1 of the output shaft 2 and the axis of the power rollers 9, 10, in the plane including the axis A1 of the output shaft 2. Moreover, an actuator 18 such as a hydraulic cylinder having a function to move the power rollers 9 and 10 backward and forward in the direction to cross its axis line.

Furthermore, the outer circumference of each power roller 9 and 10 has a sectional shape formed into a curved face of a curvature equal to that of arc of each rolling face 7 and 8 in the plane including the axis A1 of the output shaft 2. Accordingly, the outer circumferential face of the power roller 9 contacts with the rolling face 7 of the input disc 3 and the rolling face 8 of the output disc 5. Also, the outer circumferential face of the power roller 10 contacts with the rolling face 7 of the input disc 4 and the rolling face 8 of the output disc 6. Accordingly, if each disc 9, 10 is moved backward and forward by the actuator 18, the angle of inclination of the power rollers 9, 10 are changed by a sideslip force generated on the contact portions between each disc 9, 10 and the rolling faces 7, 8, and the radii of the contact portions between the power rollers 9, 10 and the rolling faces 7, 8 are thereby adjusted. Besides, as to be mentioned below, outer circumferential face of each rolling face 7, 8 and each power rollers 9, 10 are not contacted directory, because the lubricating oil exists in between each rolling face 7, 8 and each power rollers 9, 10. However, it is occasionally expressed as "contact" in this embodiment for the sake of convenience.

Next, a clamping force controlling mechanism for controlling the clamping force of each disc 3, 4, 5 and 6 for each power roller 9, 10 will be described hereinafter. A round shaped drum 11 is fixed in the position where the outer circumferential face of the output shaft 2 and facing to the side face in the opposite side of the rolling face 8 of one of the output disc 6. Also, a round shaped hydraulic chamber 12 is formed in the space surrounded by the outer circumferential face of the output shaft 2, the drum 11, and the output disc 6. An O-ring 13 is arranged between the output disc 6 and the drum 11, and the hydraulic chamber 12 is sealed by the O-ring 13 liquid tightly. Thus, the hydraulic chamber 12 is arranged in one of the end side of the axial direction against each disc 3, 4, 5 and 6.

The output disc 6 is pressed by the oil pressure of the hydraulic chamber 12 in the direction getting away from the drum 11, in other words, in the direction getting closer to the output disc 5. Besides, there is arranged a regulation member (not shown) for regulating the distance between the output disc 6 and the drum 11 not to be shorter than the predetermined value in the axial direction of the output shaft 2. Moreover, there is arranged a regulation member (not shown) for regulating the distance between the output disc 5 and the drum 11 not to be further than the predetermined value in the axial direction of the output shaft 2.

In the output shaft 2, there is provided an oil passage 13 for being communicated with the hydraulic chamber 12. A solenoid valve 14 is connected to the oil passage 13, and the lubricating oil in an oil reservoir 15 is pumped by a hydraulic pump 16. Then, the oil pressure of the discharging side of the hydraulic pump 16 is regulated by the solenoid valve 14 and acts on the hydraulic chamber 12.

Also, there is provided an electronic control unit 17 (control unit) for controlling the solenoid valve 14. The electronic control unit 17 is constructed mainly of a microcomputer having a processor (CPU or MPU), a storage device (RAM and ROM) and an input and output interface. A signal from a rolling member temperature detecting means 19, a signal from a lubricating oil temperature detecting means 20, a signal from a shift position sensor 21 for detecting the operating status of a shift position selecting device of the continuously variable transmission 1, a signal from a throttle position sensor 22 for detecting the opening of the throttle valve (not shown) of an engine as a power source, a signal from a vehicle speed sensor 23 for detecting the number of revolutions of the output shaft 2, a signal from a brake switch 24, a signal from an engine speed sensor 25, a signal from an accelerator opening sensor 26, and a signal from a torque sensor 27 for detecting the torque of the output shaft 2 are inputted into the electronic control unit 17. Also, a signal for controlling an actuator 18, and a signal for controlling the solenoid valve 14 are outputted from the electronic control unit 17 based on the signals to be inputted into the electronic control unit 17 and data stored in the electronic control unit 17.

The lubricating oil temperature detecting means 20 is a means for detecting the temperature of the lubricating oil in the oil reservoir 15 directly. Also, the rolling member temperature detecting means 19 is a means for detecting the temperature of the rolling members 9 and 10 directly. In this connection, a means for obtaining the temperature of the rolling member 9 and 10 indirectly by processing the signals and the data of the rolling member 9 and 10 other than the temperature may also be employed instead of the means for detecting the temperature of the rolling members 9 and 10 directly.

As the means for obtaining the temperature of the rolling member 9 and 10 indirectly, following means may be employed, for example; a means for calculating the temperature of the rolling members 9 and 10 based on the signal of the lubricating oil temperature detecting means 20; or a means for calculating the temperature of the rolling members 9, 10 by obtaining the energy converted at the continuously variable transmission 1 with calculating the difference between the input energy to the continuously variable transmission 1 and the output energy from the continuously variable transmission 1, then, calculating based on the heat energy and the heat radiating amount, or the heat capacity of the continuously variable transmission 1 and the like. The input energy to the continuously variable transmission 1 may be calculated based on the engine speed or the throttle opening of the engine as the power source.

Here, the output energy of the continuously variable transmission 1 may be calculated based on the number of revolutions of the output shaft 2, or the output torque. A clamping force controller is constructed of the electronic control unit 17, the solenoid valve 14, the hydraulic chamber 12, the oil passage 13, the drum 11 and so on. Here will be described the relation between the construction shown in FIG. 1 and the construction according to the present invention. The power rollers 9, 10 correspond to the rolling member of the present invention.

Next, the operation and the control of the system shown in FIG. 2 will be described hereafter. The torque of the prime mover is transmitted to the input discs 3 and 4 through the input shaft. On the other hand, the running status of a vehicle is decided based on the signal to be inputted to the electronic control unit 17, for example, the signal from the vehicle speed sensor 23, and the signal from the accelerator opening sensor 26. Then, a target input speed or a target speed change ratio of the continuously variable transmission 1 is calculated based on the decision result. The actuator is controlled in accordance with the calculation result of the target input speed or the target speed change ratio. That is, each power roller 9 and 10 is moved in the direction parallel with its rotating plane, and each power roller 9 and 10 is inclined by the sideslip force generated on the contact portion between the power rollers 9, 10 and each discs 3, 4, 5, and 6 consequently. Besides, each power roller 9 and 10 rotate with inclining to return to its positions prior to be moved by the actuator. The radii of the contact portions between the power rollers 9, 10 and the rolling faces 7, 8 are thus changed, and the speed change ratio of the continuously variable transmission 1 is thereby controlled.

On the other hand, a target oil pressure P1 is basically calculated according to the torque to be inputted to the input discs 3 and 4. The torques to be inputted to the input discs 3 and 4 are calculated based on, e.g., the signal from the engine speed sensor 25, a signal from the throttle position sensor 22 and so on. And the solenoid valve 14 is controlled in accordance with the calculation result of the torques to be inputted to the input discs 3, 4, and the oil pressure of the hydraulic chamber 12 is thereby regulated.

When the oil pressure of the hydraulic chamber 12 (i.e., end load oil pressure) is thus controlled, the output disc 6 is thrust in the axial direction toward the side of the output disc 5. Then, the thrust force is transmitted to the output disc 5 through the power roller 10, the input disc 3, 4, and the power roller 9. Here, the output disc 5 is regulated in the direction not to depart from the drum 11 more than the predetermined distance, therefore, the power roller 10 is held by the input disc 4 and the output disc 6, and the power roller 9 is held by the input disc 3 and the output disc 5. Thus, the status becomes so-called traction transmitting status, wherein the facial pressure of the contact portions between the power rollers 9, 10 and the rolling faces 7, 8 are regulated to a target facial pressure α corresponding to the oil pressure of the hydraulic chamber 12, and wherein the torque is transmitted by the shearing resistance of the lubricating oil existing between the power rollers 9, 10 and the rolling faces 7, 8.

Basically, the oil pressure of the hydraulic chamber 12 is controlled based on a torque to be inputted to the input discs 3, 4 and so on, as mentioned above. Hence, the bigger torque to be transmitted to the output discs 5, 6 from the input discs 3, 4, the higher oil pressure of the hydraulic chamber 12 is regulated. As a result, the clamping force in the axial direction acting on the power roller 9, 10 becomes bigger, and the amount of heat generated between each disc 3, 4, 5, 6 and the power roller 9, 10 increases subsequently, and thereby the power rollers 9, 10 intend to expand. However, because the clamping force is applied to the power rollers 9, 10 by each disc 3, 4, 5, and 6 in the axial direction, the expansion of those rollers is thereby prevented. Therefore, there is a possibility for the heat stress generated inside of the power rollers 9, 10 to be increased.

Figure 1:
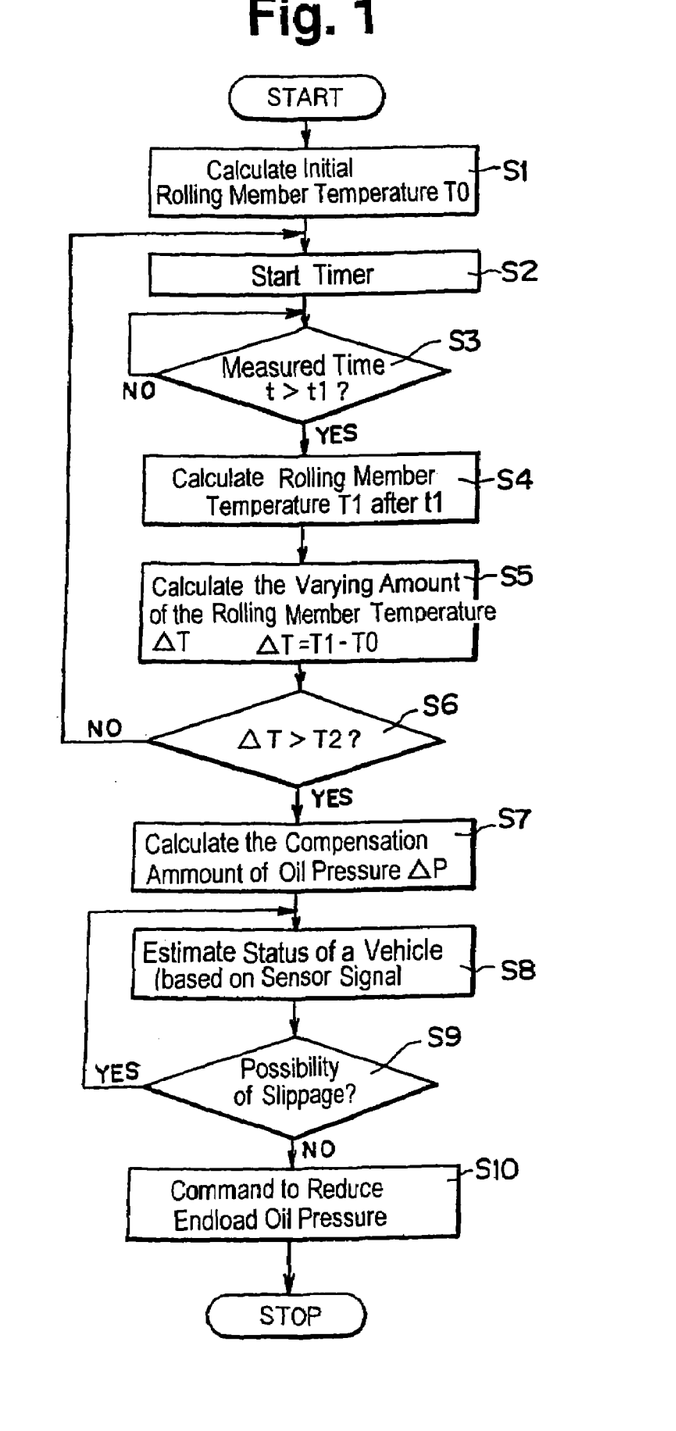
FIG. 1 is a flowchart describing a control example of the toroidal type continuously variable transmission according to this invention.

A control example for suppressing such increase of the heat stress is shown in the flowchart of FIG. 1. In FIG. 1, first of all, an initial rolling member temperature T0 is calculated based on the signal from the rolling member temperature detecting means 19 (Step S1). Then, start a timer (Step S2), and it is decided whether or not the measured time t of the timer exceeds the predetermined time t1 (Step S3). If the answer of Step S3 is NO, Step S3 is continued. On the other hand, if the answer of Step S3 is YES, a rolling member temperature T1 at after the lapse in the predetermined time t1 is calculated based on the signal from the rolling member temperature detecting means 19 (Step S4).

Moreover, a temperature varying amount of the rolling member (specifically, the amount of temperature rise) Δ T is calculated by subtracting the initial rolling member temperature T0 from the rolling member temperature T1 (Step S5). Then, it is decided whether or not the temperature varying amount of the rolling member Δ T exceeds the threshold T2 (Step S6). If the answer of Step S6 is NO, the routine is returned to Step S2, and if the answer of Step S6 is YES, the compensation amount of oil pressure Δ P corresponding to the heat stress of the power roller 9 and 10 generated from Δ T is calculated (Step S7).

Furthermore, the status of a vehicle is estimated based on the signals to be inputted to the electronic controlling device 17, e.g., a signal from the shift position sensor 21, a signal from the throttle position sensor 22, a signal from the vehicle speed sensor 23, a signal from the brake switch 24 and so on (Step S8). Then, it is decided whether or not there is a possibility to occur a slippage between each disc 3, 4, 5, 6, and each power roller 9, 10 with assuming the case to execute the control for reducing the compensation amount of the oil pressure Δ P from the target oil pressure P1 under the status of the vehicle estimated at Step S8, (Step S9). If the answer of Step S9 is YES, the routine is returned to Step S8, and if the answer of Step S9 is NO, a command for reducing the oil pressure of the hydraulic chamber 12, i.e., for reducing the compensation amount of the oil pressure Δ P from the target oil pressure P1 is outputted (Step S10), and this control routine is finished. Besides, in the control example of FIG. 1, a routine such as advancing to Step S10 from Step S8 directly with skipping Step S9 may also be employed.

Figure 3:
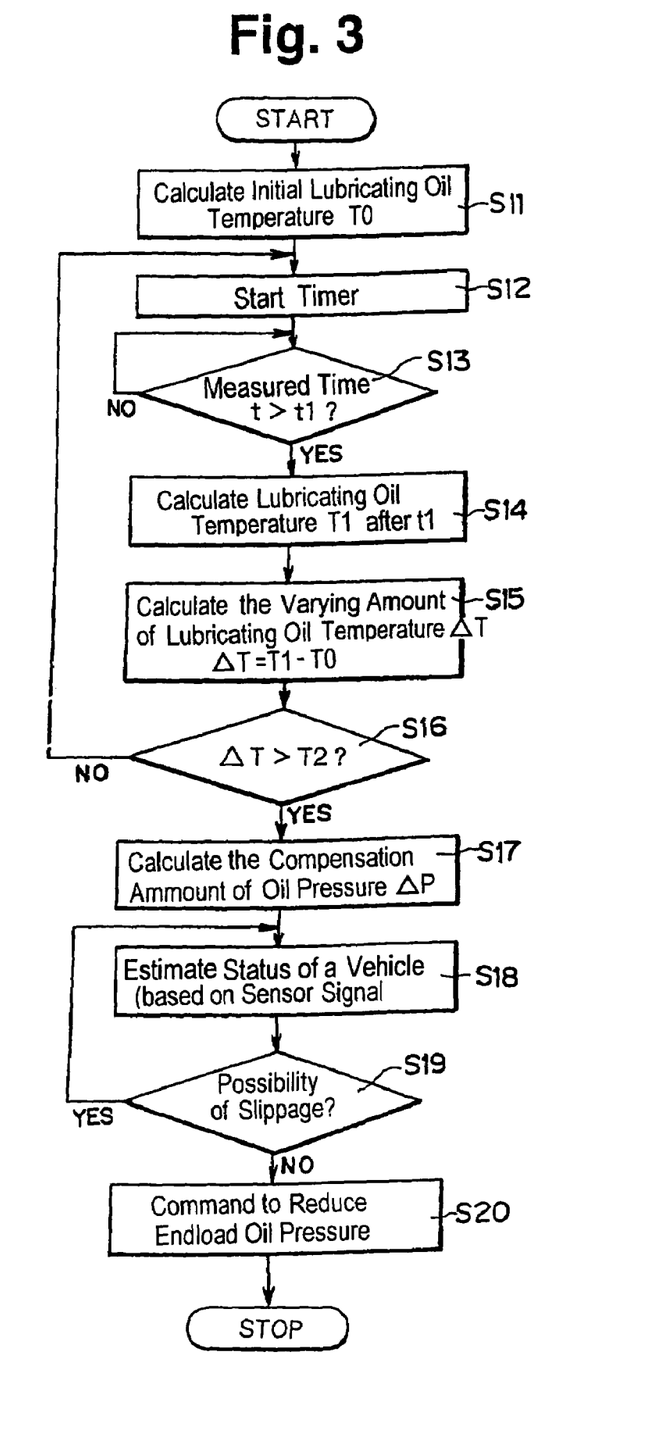
FIG. 3 is a flowchart describing another control example of the toroidal type continuously variable transmission according to this invention.

Next, another control example to suppress the increasing of the heat stress generated inside of the power rollers 9 and 10 is described in FIG. 3. In FIG. 3, the initial rolling member temperature T0 is measured first of all (Step S11), and the routine is advanced to Step S13 via Step S12. Content of Step S12 is same as the content of Step S2 in FIG. 1, and content of Step S13 is same as the content of Step S3 in FIG. 1. Besides, if the answer of Step S13 is NO, Step S13 is continued.

In FIG. 3, if the answer of Step S13 is YES, the rolling member temperature T1 at after the lapse in the predetermined time t1 is measured (Step S14). Then, the temperature varying amount of the rolling member Δ T is calculated by subtracting the initial rolling member temperature T0 from the rolling member temperature T1 (Step S15). Moreover, it is decided whether or not the temperature varying amount (specifically, the temperature increasing amount) of the rolling member Δ T exceeds the threshold T2 (Step S16). If the answer of Step S16 is NO, the routine is returned to Step S12, and if the answer of Step S16 is YES, the routine is advanced to Step S19 via Steps S17 and S18. Then, if the answer of Step S19 is YES, the routine is returned to Step S18, if the answer of Step S19 is NO, the routine is advanced to Step S20 and the routine is finished.

Here, the content of Step S17 is congruent with the content of Step S7 in FIG. 1, the content of Step S18 is congruent with the contents of Step S8 in FIG. 1, the content of Step S19 is congruent with the content of Step S9 in FIG. 1, and the content of Step S20 is congruent with the content of Step S10 in FIG. 1. Besides, in the control example of FIG. 3, a routine such as advancing to Step S20 from Step S18 directly with skipping Step S19 may also be employed.

Figure 4:
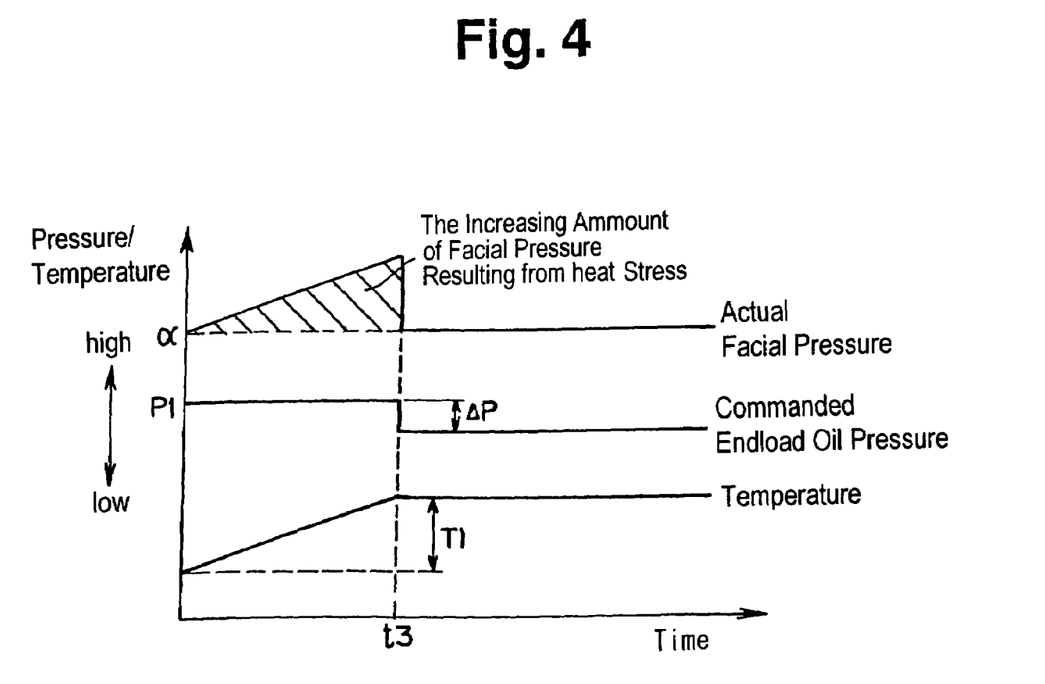
FIG. 4 is a time chart corresponding to the control example of FIG. 1 and FIG. 2.

One example of a time chart associated with FIG. 1 and FIG. 3 is shown in FIG. 4. The oil pressure of the hydraulic chamber 12 (an end load oil pressure), the facial pressure between the power rollers 9, 10 and each discs 3, 4, 5, 6 (an actual facial pressure of the rolling members), and the temperature of the power roller 9, 10 or the lubricating oil are shown in FIG. 4 chronologically. If the answer of aforementioned Step S6 in FIG. 1 or Step S16 in FIG. 3 is NO, the oil pressure of the hydraulic chamber 12 is controlled as the target oil pressure P1. The temperature of the power roller 9 and 10 or the lubricating oil rise gradually after that, and the facial pressure between the power rollers 9, 10 and each discs 3, 4, 5, 6 rise higher than the target facial pressure α.

Then, if the answer of Step S6 in FIG. 1 or Step S16 in FIG. 3 is YES at the time t3, the oil pressure of the hydraulic chamber 12 is controlled as the oil pressure, which is obtained by subtracting the compensation amount of the oil pressure Δ P from the target oil pressure P1. Also, the temperature of the power roller 9 and 10 or the lubricating oil become constant, and the facial pressure between the power rollers 9, 10 and each disc 3, 4, 5, 6 is controlled as the constant target facial pressure α. Besides, at prior to the time t3, the generally triangle area (the area depicted with diagonal lines) formed of the target facial pressure α depicted with a dotted line, and the actual facial pressure depicted with a full line, is the increasing amount of the facial pressure resulted from the heat stress of the power rollers 9 and 10. Also, in FIG. 4, the oil pressure of the hydraulic chamber 12 is reduced drastically at the time t3; however, reducing mode of the oil pressure of the hydraulic chamber 12 may be arbitrarily set, such as, reducing the oil pressure of the hydraulic chamber 12 with a plurality of steps, or reducing with a gradual inclination characteristic.

Here, to describe the relation between the construction of the example shown in FIGS. 1, 3 and the construction according to the present invention, the device for executing Step S1 or Step S10 in FIG. 1, and Step S11 or Step S20 in FIG. 3 corresponds to the clamping force controlling device according to the present invention.

As described above, according to the control example of FIG. 1 or FIG. 3, the clamping force applied to the input discs 3, 4 and the output discs 5, 6 in the axial direction is reduced as the pressure obtained by subtracting the compensation amount of the oil pressure $\Delta P$ from the target oil pressure P1, when the physical quantity relevant to the temperature of the power rollers 9 and 10, specifically, the increasing amount of the temperature of the power roller 9 and 10 or the lubricating oil exceeds the predetermined increasing amount. Therefore, increasing of the heat stress generated on the power rollers 9, 10 is suppressed, and the facial pressure between the power rollers 9, 10 and each disc 3, 4, 5, 6 is prevented from increasing more than necessary, i.e., increasing more than the facial pressure corresponds to the torque to be transmitted. Accordingly, durability of the power rollers 9 and 10 is thereby improved.

Besides, the continuously variable transmission 1 as depicted in FIG. 2 is a double cavity type continuously variable transmission, which comprises two cavities as spaces for accommodating two power rollers 9 and 10; however, the present invention may also be applied to a single cavity type continuously variable transmission which comprises one cavity. Moreover, the present invention may also be applied to a half toroidal type continuously variable transmission.

Here will be synthetically described the advantages to be attained by this invention. According to the present invention, as has been described hereinbefore, the clamping force in the axial direction which is applied to the input disc and the output disc is controlled based on the physical amount relevant to the heat stress of the rolling member. Therefore, increasing of the heat stress generated on the rolling member is suppressed even in case of the rolling member intends to expand due to change of physical amount relevant to the heat stress of the rolling member. Accordingly, increasing of the facial pressure between the rolling member and each disc can be avoided, and the life duration of the rolling member is thereby improved.

According to the present invention, the clamping force to be applied to the input disc and the output disc in the axial direction is controlled based on the temperature of the rolling member, so that the heat stress acting on the rolling member may be suppressed. And moreover, the life duration of the rolling member or the continuously variable transmission may be improved.

Likewise, according to the present invention, the clamping force to be applied to the input disc and the output disc in the axial direction is controlled based on the temperature of the lubricating oil, so that the heat stress acting on the rolling member may be suppressed. And moreover, the life duration of the rolling member or the continuously variable transmission may be improved.

Furthermore, according to the present invention, the clamping force of the input discs and the output discs for clamping the rolling member may be reduced in case that the increasing amount of the temperature of the rolling member or the lubricating oil exceeds the predetermined increasing amount.

INDUSTRIAL APPLICABILITY

This invention can be utilized in the field for manufacturing the continuously variable transmission and in the field for using the continuously variable transmission. Especially, this invention can be utilized in the field relating to an automobile having the continuously variable transmission mounted thereon.

The invention claimed is:

1. A toroidal type continuously variable transmission, in which an input disc and an output disc are arranged on a common axis in a rotatable condition and opposed to each other, and in which a rolling member is arranged between the input disc and the output disc, so as to transmit a torque between said input disc and said output disc through said rolling member, by applying a clamping force to said input disc and said output disc in an axial direction, comprising:
    a clamping force controller that includes a device for reducing the clamping force to be applied to said input disc and said output disc in accordance with a rise in a temperature of at least one of (1) said rolling member or (2) lubricating oil to be interposed between said input disc and said output disc.

2. A toroidal type continuously variable transmission according to claim 1, wherein
    the device reduces the clamping force to be applied to said input disc and said output disc when the temperature of the rolling member or the lubricating oil exceeds a predetermined increasing amount of the temperature.

3. A toroidal type continuously variable transmission according to claim 1,
    further comprising means for detecting temperature of said rolling member directly; wherein
    the device for reducing the clamping force to be applied to said input disc and output disc performs the reduction of the clamping force in accordance with the rise in the temperature of the rolling member detected directly.

4. A toroidal type continuously variable transmission according to claim 1,
    further comprising means for detecting temperature of said rolling member indirectly; wherein
    the device for reducing the clamping force to be applied to said input disc and output disc performs the reduction of the clamping force in accordance with the rise in the temperature of the rolling member detected indirectly.

5. A toroidal type continuously variable transmission according to claim 1, comprising:
    a detector that directly detects a temperature of the rolling member.

* * * * *

UNITED STATES PATENT AND TRADEMARK OFFICE
CERTIFICATE OF CORRECTION

PATENT NO. : 7,166,055 B2
APPLICATION NO. : 10/451430
DATED : January 23, 2007
INVENTOR(S) : Yasuji Taketsuna and Shigenori Tamaki It is certified that error appears in the above-identified patent and that said Letters Patent is hereby corrected as shown below:

Column 10, beginning at Line 17, please replace all claims with the following set of claims:

1. A toroidal type continuously variable transmission, in which an input disc and an output disc are arranged on a common axis in a rotatable condition and opposed to each other, and in which a rolling member is arranged between the input disc and the output disc, so as to transmit a torque between said input disc and said output disc through said rolling member, by applying a clamping force to said input disc and said output disc in an axial direction, comprising:

a clamping force controller that includes a device for reducing the clamping force to be applied to said input disc and said output disc in accordance with a rise in a temperature of at least one of (1) said rolling member or (2) lubricating oil to be interposed between said input disc and said output disc.

2. A toroidal type continuously variable transmission according to claim 1, wherein the device reduces the clamping force to be applied to said input disc and said output disc when the temperature of the rolling member or the lubricating oil exceeds a predetermined increasing amount of the temperature.

UNITED STATES PATENT AND TRADEMARK OFFICE
CERTIFICATE OF CORRECTION

PATENT NO. : 7,166,055 B2
APPLICATION NO. : 10/451430
DATED : January 23, 2007
INVENTOR(S) : Yasuji Taketsuna and Shigenori Tamaki It is certified that error appears in the above-identified patent and that said Letters Patent is hereby corrected as shown below:

3. A toroidal type continuously variable transmission according to claim 1, further comprising means for detecting temperature of said rolling member directly; wherein the device for reducing the clamping force to be applied to said input disc and output disc performs the reduction of the clamping force in accordance with the rise in the temperature of the rolling member detected directly.

4. A toroidal type continuously variable transmission according to claim 1, further comprising means for detecting temperature of said rolling member indirectly; wherein the device for reducing the clamping force to be applied to said input disc and output disc performs the reduction of the clamping force in accordance with the rise in the temperature of the rolling member detected indirectly.

5. A toroidal type continuously variable transmission, in which an input disc and an output disc are arranged on the common axis with being opposed to each other in the rotatable condition, and in which the rolling member is arranged between the input disc and the output disc, so as to transmit a torque between said input disc and said output disc through said rolling member, by applying a clamping force to said input disc and said output disc in said axial direction, comprising:

a clamping force controller for controlling the clamping force to be applied to said input disc and output disc based on a rise in a physical quantity relevant

UNITED STATES PATENT AND TRADEMARK OFFICE
CERTIFICATE OF CORRECTION

PATENT NO. : 7,166,055 B2
APPLICATION NO. : 10/451430
DATED : January 23, 2007
INVENTOR(S) : Yasuji Taketsuna and Shigenori Tamaki It is certified that error appears in the above-identified patent and that said Letters Patent is hereby corrected as shown below:

to the heat stress of the rolling member, in order to suppress the heat stress generated on said rolling member in case of said rolling member is thermally expanded.

6. A toroidal type continuously variable transmission according to claim 5, wherein said clamping force controller includes a device for reducing the clamping force to be applied to said input disc and output disc in accordance with a rise in a temperature of said rolling member.

7. A toroidal type continuously variable transmission according to claim 5, wherein said clamping force controller includes a device for reducing the clamping force to be applied to said input disc and output disc in accordance with a rise in a temperature of the lubricating oil to be interposed in between said rolling member and said input disc, and in between said rolling member and said output disc.

8. A toroidal type continuously variable transmission according to claim 7, wherein said clamping force controller includes a device for reducing the clamping force to be applied to said input disc and output disc in case that the temperature of said rolling member or said lubricating oil exceeds the predetermined increasing amount of the temperature.

UNITED STATES PATENT AND TRADEMARK OFFICE
CERTIFICATE OF CORRECTION

| | |
|---|---|
| PATENT NO. | : 7,166,055 B2 |
| APPLICATION NO. | : 10/451430 |
| DATED | : January 23, 2007 |
| INVENTOR(S) | : Yasuji Taketsuna and Shigenori Tamaki |

It is certified that error appears in the above-identified patent and that said Letters Patent is hereby corrected as shown below:

9. A toroidal type continuously variable transmission according to claim 7, wherein said clamping force controller includes a device for reducing the clamping force to be applied to said input disc and output disc in case that the temperature of said rolling member or said lubricating oil exceeds the predetermined increasing amount of the temperature.

10. A control method for a toroidal type continuously variable transmission, in which an input disc and an output disc are arranged on the common axis with being opposed to each other in the rotatable condition, and in which the rolling member is arranged between the input disc and the output disc, so as to transmit a torque between said input disc and said output disc through said rolling member, by applying a clamping force to said input disc and said output disc in said axial direction, comprising:

a clamping force controlling step for controlling the clamping force to be applied to said input disc and output disc based on a rise in physical quantity relevant to the heat stress of the rolling member, in order to suppress the heat stress generated on said rolling member in case of said rolling member is thermally expanded.

11. A control method for a toroidal type continuously variable transmission according to claim 10, wherein said clamping force controlling step includes a step of reducing the clamping force to be applied to said input disc and output disc in accordance with a rise in a temperature of said rolling member.

UNITED STATES PATENT AND TRADEMARK OFFICE
CERTIFICATE OF CORRECTION

| | |
|---|---|
| PATENT NO. | : 7,166,055 B2 |
| APPLICATION NO. | : 10/451430 |
| DATED | : January 23, 2007 |
| INVENTOR(S) | : Yasuji Taketsuna and Shigenori Tamaki |

It is certified that error appears in the above-identified patent and that said Letters Patent is hereby corrected as shown below:

12.    A control method for a toroidal type continuously variable transmission according to claim 10, wherein said clamping force controlling step includes a step of reducing the clamping force to be applied to said input disc and output disc in accordance with a rise in a temperature of the lubricating oil to be interposed in between said rolling member and said input disc, and in between said rolling member and said output disc.

13.    A control method for a toroidal type continuously variable transmission according to claim 11, wherein said clamping force controlling step in cludes a step of reducing the clamping force to be applied to said input disc and output disc in case that the temperature of said rolling member or said lubricating oil exceeds the predetermined increasing amount of the temperature.

14.    A control method for a toroidal type continuously variable transmission according to claim 12, wherein said clamping force controlling step includes a step of reducing the clamping force to be applied to said input disc and output disc in case that the temperature of said rolling member or said lubricating oil exceeds the predetermined increasing amount of the temperature.

UNITED STATES PATENT AND TRADEMARK OFFICE
CERTIFICATE OF CORRECTION

PATENT NO. : 7,166,055 B2
APPLICATION NO. : 10/451430
DATED : January 23, 2007
INVENTOR(S) : Yasuji Taketsuna and Shigenori Tamaki It is certified that error appears in the above-identified patent and that said Letters Patent is hereby corrected as shown below:

15. A toroidal type continuously variable transmission according to claim 1, comprising: a detector that directly detects a temperature of the rolling member.

Signed and Sealed this

Seventeenth Day of April, 2007

JON W. DUDAS
*Director of the United States Patent and Trademark Office*